United States Patent
Oohara (10) Patent No.: US 10,289,075 B2
(45) Date of Patent: May 14, 2019

(54) MACHINE LEARNING APPARATUS FOR OPTIMIZING CYCLE PROCESSING TIME OF PROCESSING MACHINE, MOTOR CONTROL APPARATUS, PROCESSING MACHINE, AND MACHINE LEARNING METHOD

(71) Applicant: FANUC CORPORATION, Yamanashi (JP)

(72) Inventor: Taku Oohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 209 days.

(21) Appl. No.: 15/280,992

(22) Filed: Sep. 29, 2016

(65) Prior Publication Data
US 2017/0090428 A1  Mar. 30, 2017

(30) Foreign Application Priority Data
Sep. 30, 2015 (JP) .................. 2015-192970

(51) Int. Cl.
*G06F 15/18* (2006.01)
*G05B 13/02* (2006.01)
(Continued)

(52) U.S. Cl.
CPC ............ *G05B 13/027* (2013.01); *G06N 3/08* (2013.01); *G06N 3/084* (2013.01); *G06N 5/045* (2013.01); *Y04S 10/54* (2013.01)

(58) Field of Classification Search
None
See application file for complete search history.

(56) References Cited

U.S. PATENT DOCUMENTS 6,597,959 B1 * 7/2003 Backa .................. G05B 13/048
700/127

FOREIGN PATENT DOCUMENTS

| CN | 101738981 A | 6/2010 |
| CN | 103823409   | 5/2014 |

(Continued)

OTHER PUBLICATIONS

Koji Iwamura et al., "Applying Multi-agent Reinforcement Learning to Autonomous Distributed Real-time Scheduling", Transactions of the Institute of Systems, Control and Information Engineers, Apr. 23, 2013, pp. 129-137, vol. 26(2013), No. 4, Japan, for which an explanation of relevance is attached, English portions only.

(Continued)

*Primary Examiner* — Robert A Cassity
*Assistant Examiner* — Daniel T Pellett
(74) *Attorney, Agent, or Firm* — Hauptman Ham, LLP (57) ABSTRACT

A machine learning apparatus includes a state observing unit and a learning unit. The state observation unit observes, during repeated processing operations, a state variable including a processing downtime and at least one of an actual one-cycle processing time of a processing machine and the temperature of a motor. The learning unit learns a value for selecting, based on the state variable and an overheat alarm level, the shortest processing downtime, which satisfies the fact that the temperature of the motor does not exceed the overheat alarm level when the repeated processing operations are performed.

6 Claims, 5 Drawing Sheets

(51) Int. Cl.
*G06N 3/08* (2006.01)
*G06N 5/04* (2006.01)

(56) References Cited

FOREIGN PATENT DOCUMENTS

| | | |
|---|---|---|
| DE | 10049506 A1 | 4/2001 |
| DE | 10144459 A1 | 4/2003 |
| EP | 2093642 A1 | 8/2009 |
| JP | 9-91025 A | 4/1997 |
| JP | 2002-355724 A | 12/2002 |
| JP | 2003-136115 A | 5/2003 |
| JP | 2003-208205 A | 7/2003 |
| JP | 2006-172141 A | 6/2006 |
| JP | 4461371 B2 | 5/2010 |
| JP | 2013-70485 A | 4/2013 |
| JP | 2015-103168 A | 6/2015 |
| WO | 2014/020763 A1 | 2/2014 |

OTHER PUBLICATIONS

"Feature 1; Industry 4.0 is not scary. 3Robot volume", Nikkei Monodukuri, Nikkei Business Publications, Inc., Aug. 28, 2015, , pp. 42-44, No. 732, Japan, for which an explanation of relevance is attached, English portions only.

* cited by examiner

MACHINE LEARNING APPARATUS FOR OPTIMIZING CYCLE PROCESSING TIME OF PROCESSING MACHINE, MOTOR CONTROL APPARATUS, PROCESSING MACHINE, AND MACHINE LEARNING METHOD

RELATED APPLICATIONS

The present application claims priority to Japanese Patent Application Number 2015-192970 filed Sep. 30, 2015, the disclosure of which is hereby incorporated by reference herein in its entirety.

BACKGROUND OF THE INVENTION

1. Field of the Invention

The present invention relates to a machine learning apparatus, a motor control apparatus, a processing machine, and a machine learning method. In particular, the present invention relates to a machine learning apparatus for optimizing a cycle processing time of a processing machine, a motor control apparatus provided with the machine learning apparatus, a processing machine, and a machine learning method.

2. Description of the Related Art

Upon a motor is operated, temperature of a winding of the motor increases. Further, when a certain period of time elapses since the motor starts operating, the temperature of the winding is saturated so that the winding is maintained at a high temperature (This temperature is referred to as "saturation temperature" hereinafter). In the winding having such a saturation temperature, when application of electric current to the winding is continued while the temperature of the winding exceeds its upper limit, the winding of the motor can burn out. Alternatively, even when the temperature of the winding is not saturated, if the temperature of the winding exceeds its upper limit, the winding of the motor can be damaged.

Thus, in drive control of a motor, the temperature of a winding has conventionally been monitored, and, when the temperature of the winding exceeds a predetermined temperature threshold, application of electric current to the winding is discontinued to prevent the winding from burning out or being damaged (see, for example, Japanese Patent Application Laid-open No. 2013-70485). The above temperature threshold is referred to as "overheat alarm level".

Furthermore, in a processing machine, a motor is employed for a main spindle for rotating a tool, and accordingly, the temperature of the motor for the main spindle is controlled to be less than the overheat alarm level, to prevent a failure of the motor.

Specifically, in a processing machine, when a processing operation having a predetermined processing pattern is constantly repeated, the temperature of a winding of the motor exceeds its upper limit, and accordingly, processing downtime is set after one cycle of processing operation time. In other words, in the processing downtime, a motor control apparatus tries not to apply electric current to the winding of the motor. In this specification, the sum of the processing operation time and the processing downtime is referred to as "one-cycle processing time".

However, when the processing downtime is set in the motor control apparatus as described above, it is necessary that an operator should actually operate the processing machine, to find, through trial and error, the shortest processing downtime which satisfies the fact that the temperature of the winding of the motor does not exceed an alarm level. Further, inaccurate setting of the processing downtime causes a burn out of the winding or a reduction in the operation rate of the processing machine. Thus, the operator requires a lot of labor and time to accurately find the processing downtime.

SUMMARY OF THE INVENTION

The present invention provides a machine learning apparatus which can find the above processing downtime without an operator, a motor control apparatus, a processing machine, and a machine learning method.

According to a first aspect of the present invention, there is provided a machine learning apparatus that is adapted to determine a processing downtime of a one-cycle processing time comprised of a one-cycle processing operation time and the processing downtime of a processing machine, so that the temperature of a motor for performing repeated processing operations of the processing machine does not exceed a predetermined temperature threshold. The machine learning apparatus includes a state observation unit which is adapted to observe, during the repeated processing operations, a state variable including the processing downtime and at least one of an actual one-cycle processing time of the processing machine and the temperature of the motor, and a learning unit which is adapted to learn a value for selecting, based on the state variable and the temperature threshold, the shortest processing downtime, which satisfies the fact that the temperature of the motor does not exceed the temperature threshold when the repeated processing operations are performed.

According to a second aspect of the present invention, the machine learning apparatus of the first aspect further includes a decision-making unit which is adapted to decide the processing downtime which should be set in a motor control apparatus for controlling the motor.

According to a third aspect of the present invention, in the machine learning apparatus of the first or second aspect, the learning unit includes a reward computation unit which is adapted to compute a reward based on the one-cycle processing time and the temperature of the motor of the state variable, and a function update unit which is adapted to update a value function representing a value for selecting the shortest processing downtime based on the reward.

According to a fourth aspect of the present invention, in the machine learning apparatus of the third aspect, the function update unit has an action-value table in which the state variable is associated with the value function, and is adapted to update the action-value table based on the reward.

According to a fifth aspect of the present invention, in the machine learning apparatus of the fourth aspect, the reward computation unit is adapted to increase the reward based on the difference between the temperature of the motor when the repeated processing operations are performed and the temperature threshold, when the one-cycle processing time observed by the state observation unit decreases in comparison with the one-cycle processing time corresponding to the lowest value function in the action-value table. The reward computation unit is adapted to decrease the reward when the one-cycle processing time observed by the state observation unit increases in comparison with the one-cycle processing time corresponding to the lowest value function in the action-value table, and when the temperature of the motor reaches the temperature threshold when the repeated processing operations are performed.

According to a sixth aspect of the present invention, there is provided a motor control apparatus including the machine learning apparatus of any of the first to fifth aspects.

According to a seventh aspect of the present invention, there is provided a processing machine including the motor control apparatus of the sixth aspect.

According to an eighth aspect of the present invention, there is provided a machine learning method for determining a processing downtime of a one-cycle processing time comprised of a one-cycle processing operation time and the processing downtime of a processing machine, so that the temperature of a motor for performing repeated processing operations of the processing machine does not exceed a predetermined temperature threshold. The machine learning method comprises: observing, during the repeated processing operations, a state variable including the processing downtime and at least one of an actual one-cycle processing time of the processing machine and the temperature of the motor; and learning a value for selecting, based on the state variable and the temperature threshold, the shortest processing downtime, which satisfies the fact that the temperature of the motor does not exceed the temperature threshold when the repeated processing operations are performed.

According to the first to eighth aspects of the present invention, the shortest processing downtime, which satisfies that fact that the temperature of a motor does not exceed a predetermined temperature threshold when the processing machine performs repeated processing operations, can be determined, without an operator, in the motor control apparatus. This can reduce the labor or time required of an operator, which is necessary to set the processing downtime in the motor control apparatus.

BRIEF DESCRIPTION OF THE DRAWINGS

These objects, features, and advantages of the present invention and other objects, features, and advantages will become further clearer from the detailed description of typical embodiments illustrated in the appended drawings.

DETAILED DESCRIPTION

Embodiments of the present invention will be described below with reference to the drawings. In the following figures, similar members are designated with the same reference numerals. These figures are properly modified in scale to assist the understanding thereof. Further, the embodiments illustrated in the drawings are examples to carry out the present invention, and the present invention is not limited to the illustrated embodiments.

Figure 1:
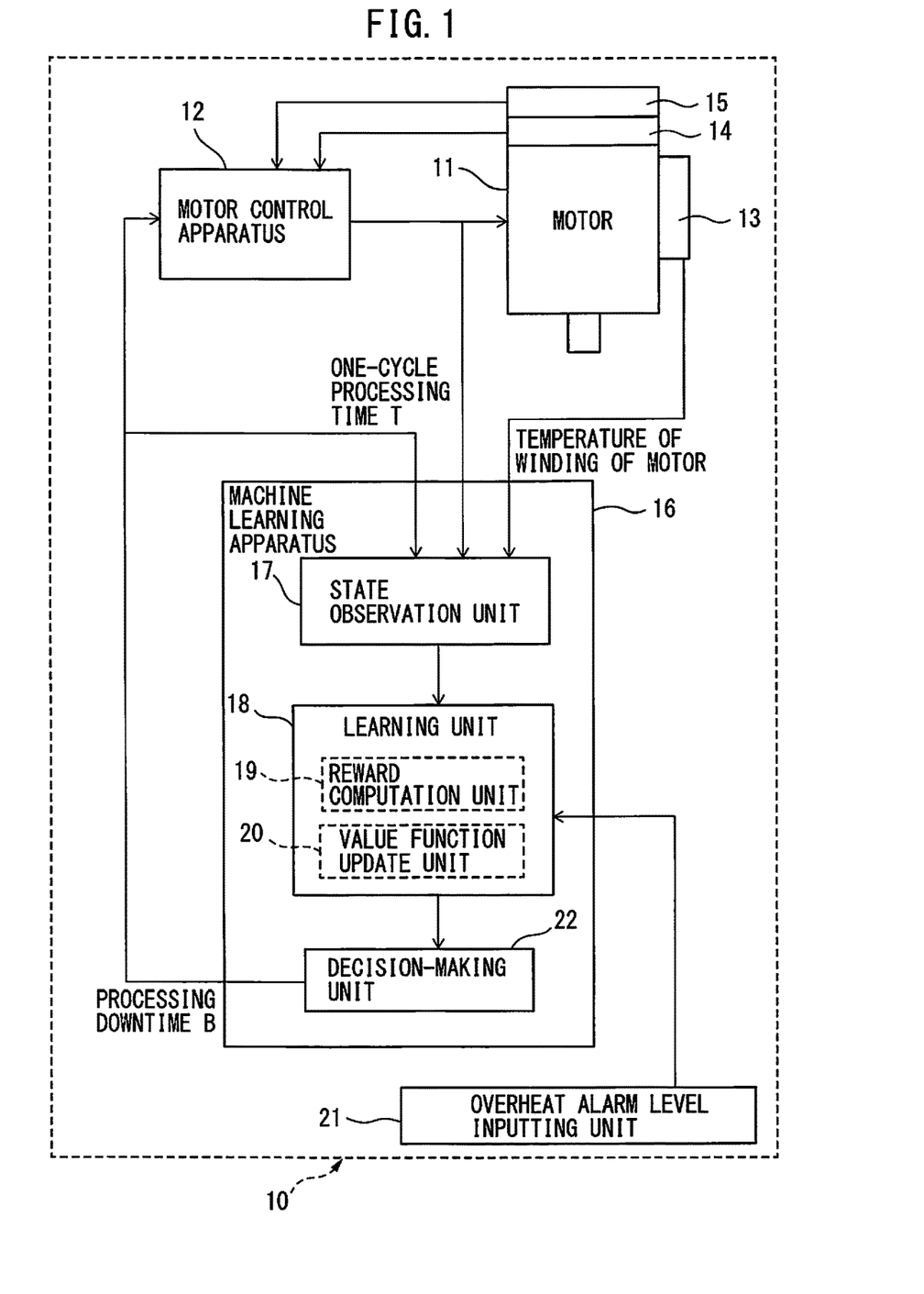
FIG. 1 is a block diagram illustrating the configuration of a processing machine according to an embodiment of the present invention.

FIG. 1 is a block diagram illustrating the configuration of a processing machine according to an embodiment of the present invention.

A processing machine 10 shown in FIG. 1 is provided with a motor 11 for rotating a tool, for example, a drill attached to a main spindle of the processing machine 10, a motor control apparatus 12 for controlling the motor 11, a temperature sensor 13 for measuring the temperature of a winding of the motor 11, a current sensor 14 for measuring electric current passing through the motor 11, and a speed sensor 15 for measuring a rotation speed of the motor 11.

The processing machine 10 is preferably an NC machine tool or a processing robot. The motor 11 is, for example, a servo motor disposed for the main spindle of the processing machine 10. The temperature sensor 13 is preferably a thermistor. The speed sensor 15 is preferably a pulse encoder for measuring a rotation speed of the motor 11 based on the number of rotations of the motor 11.

The motor control apparatus 12 reads out an operation command value from a previously stored operation program, and controls the motor 11 in accordance with the operation command value. In particular, the motor control apparatus 12 according to the present embodiment previously stores an operation program for performing repeated processing operations using a tool to be rotated by the motor 11.

Note that the term "repeated processing operations" means that a processing operation having a predetermined processing pattern is repeated, e.g., a processing operation for drilling a hole having a certain depth using a drill attached to a main spindle is repeated. Thus, for example, the number of rotations (rotation speed) of a tool, such as a drill, or processing position data in the processing operation having a predetermined processing pattern is written in the operation program.

In order to confirm whether the motor 11 operates in accordance with the operation program, the current value of the motor 11, which has measured by the current sensor 14, is transmitted to the motor control apparatus 12. In addition, the rotation speed value of the motor 11, which has been measured by the speed sensor 15, is transmitted to the motor control apparatus 12. The motor control apparatus 12 can monitor and control load torque to be applied to a tool during a processing operation, by acquiring the current value of the motor 11 from the current sensor 14. Further, the motor control apparatus 12 can monitor and control the rotation speed of a tool during a processing operation, by acquiring the rotation speed of the motor 11 from the speed sensor 15.

However, when the repeated processing operations are performed as described above, electrical current is constantly applied to the motor 11, and accordingly, the temperature of the winding of the motor 11 exceeds its upper limit, and the winding can burn out or can be damaged. Thus, as described in the background of the invention, it is necessary that processing downtime is set after one cycle of processing operation time, to prevent the temperature of the winding of the motor 11 from exceeding the overheat alarm level. It is also necessary that such processing downtime is determined in the operation program for performing the repeated processing operations.

Figure 2:
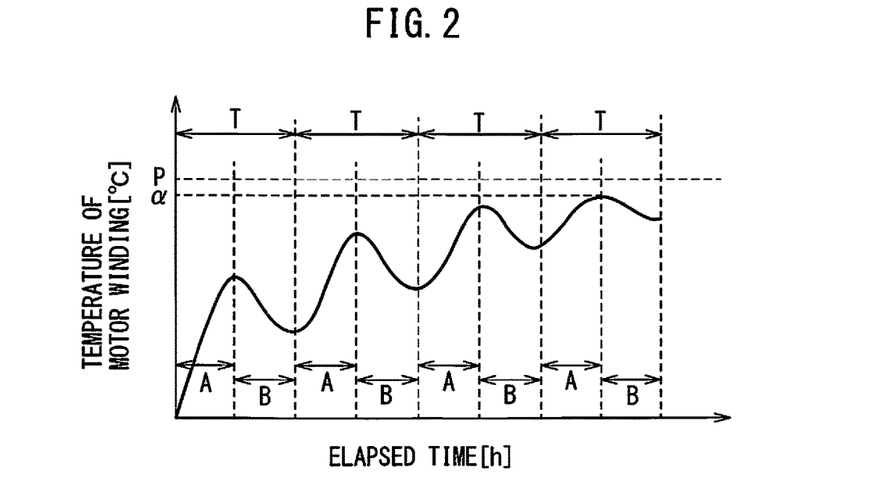
FIG. 2 is a graph illustrating temporal change in the temperature of a winding of a motor when repeated processing operations are performed, and one-cycle processing times T each comprised of processing operation time A and processing downtime B.

FIG. 2 is a graph illustrating temporal change in the temperature of the winding of the motor 11, which has been measured by the temperature sensor 13, when the repeated processing operations are performed, and one-cycle processing times T each comprised of processing operation time A and processing downtime B.

As shown in FIG. 2, when the one-cycle processing time T is repeated, the temperature of the winding of the motor 11 repeatedly increases and decreases. Further, as the processing downtime B shortens, the amount of decrease in the temperature of the winding of the motor 11 reduces. As the processing downtime B elongates, the amount of decrease in the temperature of the winding of the motor 11 increases. Thus, when the processing downtime B is too short, the temperature of the winding of the motor 11 may reach an overheat alarm level P before a predetermined number of repeated processing operations are complete. In contrast, when the processing downtime B is long, if the processing machine 10 performs a predetermined number of repeated processing operations, it would be difficult that the temperature of the winding of the motor 11 reaches the overheat alarm level P. However, as the processing downtime B elongates, the operating time of the processing machine 10 increases when a predetermined number of repeated processing operations are performed. Note that the present embodiment is made on the assumption that the processing machine 10 repeats the same processing operation, and accordingly, all processing operation times A have a substantially identical length.

Under these conditions, it is necessary to find the shortest processing downtime B which satisfies the fact that the temperature of the winding of the motor 11 does not exceed the overheat alarm level P when the processing machine 10 performs the repeated processing operations.

The invention of this application is intended to find an optimal value of the processing downtime B, by a machine learning method, for example, Q-learning that will be described later.

The processing machine 10 according to the present embodiment is provided with a machine learning apparatus 16 which can use machine learning to find an optimal value of the processing downtime B when the repeated processing operations are performed, and can set up the optimal value in the motor control apparatus 12.

Figure 3:
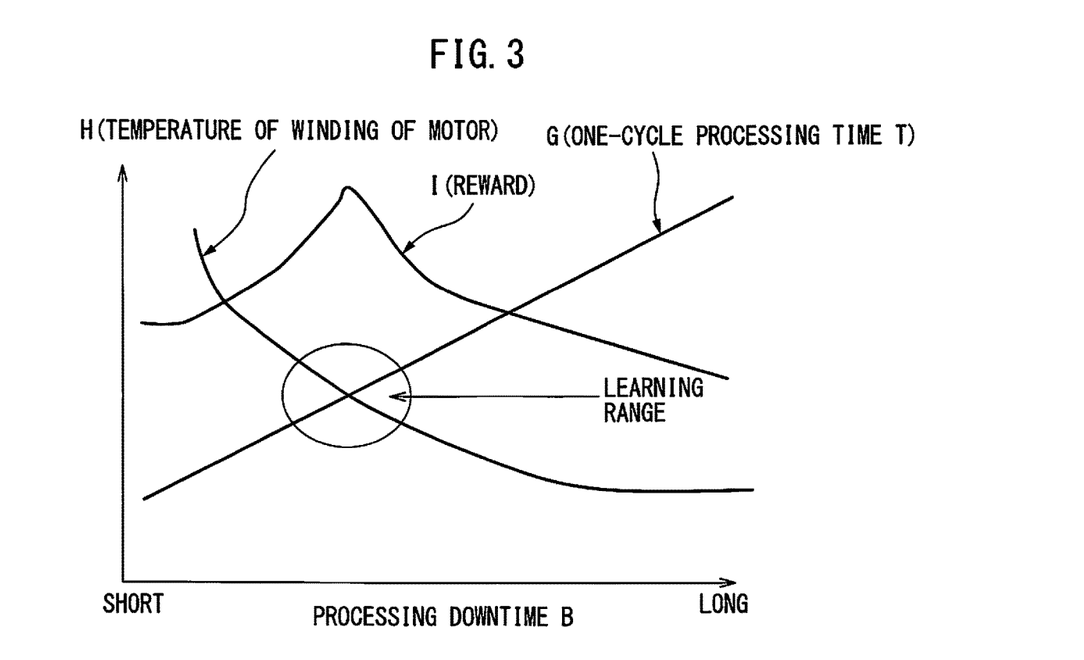
FIG. 3 is an explanatory view of a range of learning performed by a machine learning apparatus according an embodiment of the present invention.

FIG. 3 is an explanatory view of a range of learning performed by the machine learning apparatus 16 according to the present embodiment. As expressed by a straight line G in FIG. 3, the one-cycle processing time T increases in proportion to the length of the processing downtime B. In contrast, as expressed by a curve line H in FIG. 3, as the processing downtime B elongates, the temperature of the winding of the motor 11 reduces. The optimal value of the processing downtime B when the repeated processing operations are performed corresponds to the intersection of the straight line G and the curved line H. Further, the machine learning apparatus 16 according to the present embodiment changes a reward to be given to a change in the processing downtime B.

Specifically, the machine learning apparatus 16 according to the present embodiment is provided with a state observation unit 17, a learning unit 18, and a decision-making unit 22, as shown in FIG. 1.

The state observation unit 17 observes, while the repeated processing operations are performed, the processing downtime B decided by the decision-making unit 22, and a state variable including at least one of the actual one-cycle processing time T of the processing machine 10 and the temperature of the motor 11.

The processing downtime B is output from the decision-making unit 22 to the state observation unit 17. The actual one-cycle processing time T is output from the motor control apparatus 12 to the state observation unit 17. The temperature of the winding of the motor 11 is output from the temperature sensor 13 to the state observation unit 17.

The "actual one-cycle processing time T" to be output from the motor control apparatus 12 to the state observation unit 17 is the sum of an actual one cycle of the processing operation time A shown in FIG. 2 and the actual processing downtime B subsequent to the processing operation time A (T=A+B).

The processing operation time A corresponds to an actual processing time elapsing when a tool performs a processing operation in accordance with an operation program. The processing downtime B corresponds to a time in which the motor control apparatus 12 discontinues power supplied to the motor 11 in accordance with the processing downtime B designated by the decision-making unit 22 of the machine learning apparatus 16.

The learning unit 18 learns a value for selecting, based on the state variable and the overheat alarm level P, the shortest processing downtime B which satisfies the fact that the temperature of the winding of the motor 11 does not exceed the overheat alarm level P when the repeated processing operations are performed.

It is preferable that an overheat alarm level inputting unit 21 is connected to the learning unit 18. The overheat alarm level to be inputted to the learning unit 18 is defined as a temperature threshold in which a margin value is estimated with respect to the saturation temperature of the winding of the motor 11 when electrical current at continuous rating is continuously applied to the motor 11. The "electrical current at continuous rating" means a maximum current value at which electrical current can be continuously applied to the winding of the motor 11 without overheating the winding.

The decision-making unit 22 decides the processing downtime B corresponding to the highest value among a plurality of values acquired by the learning unit 18 after the completion of machine learning performed by the learning unit 18, and transmits the decided processing downtime B to the motor control apparatus 12. On the other hand, the decision-making unit 22 randomly decides the processing downtime B during machine learning, and transmits the same to the motor control apparatus 12.

The learning unit 18 according to the present embodiment is provided with a reward computation unit 19 and a function update unit 20 as shown in FIG. 1.

The reward computation unit 19 computes a reward based on the actual one-cycle processing time T of the processing machine 10 and the temperature of the winding of the motor 11 in the above state variable. FIG. 1 shows that the reward computation unit 19 is provided within the learning unit 18. However, the reward computation unit 19 may be provided outside of the learning unit 18.

The function update unit 20 updates, based on the reward, a value function representing the value for selecting the shortest processing downtime B.

The machine learning apparatus 16 will now be described in detail. The machine learning apparatus 16 has a function for analytically extracting useful rules or knowledge representations, criteria for determination, etc. from the assembly of data inputted to the apparatus, and a function for outputting the results of determination, and learning knowledges. There are various machine learning methods, and the methods are roughly divided into "supervised learning", "unsupervised learning", and "reinforcement learning". In order to achieve these learning methods, there is another method referred to as "deep learning" for learning extraction of feature quantity itself.

"Supervised learning" is a method in which a large volume of input-output (label) paired data are given to a learning apparatus, so that characteristics of these datasets can be learned, and a model for inferring an output value from input data, i.e., the input-output relation can be inductively acquired. This can be achieved using an algorithm, for example, a neural network that will be described later.

"Unsupervised learning" is a method in which a large volume of input-only data are given to a learning apparatus, so that the distribution of the input data can be learned, and a device for, for example, compressing, classifying, and fairing the input data can be learned even if the corresponding teacher output data are not given. For example, characteristics of these datasets can be clustered based on their similarity. The result obtained from the learning is used to set a certain criterion, and then, the allocation of output is performed so as to optimize the criterion, so that the prediction of output can be achieved. There is another problem setting method situated between "unsupervised learning" and "supervised learning", which is known as "semi-supervised learning". In this learning method, a small volume of input-output paired data and a large volume of input-only data are provided. In the present embodiment, data which can be acquired even when a processing machine is not actually operated are used in unsupervised learning, to efficiently perform learning.

Problems are set in reinforcement learning as follows.

A processing machine observes the state of environment, and decides an action.

The environment varies in accordance with some rules, and your action can vary the environment.

A reward signal is returned with each action.

The target of maximization is the sum of (discount) rewards to be obtained now and in the future.

Learning starts from the state in which a result caused by an action is completely unknown, or is incompletely known. The processing machine can acquire the result as data only after it begins operating. In other words, it is necessary to search the optimal action through trial and error.

It is also possible to set, as an initial state, the state, in which a prior learning (e.g., the above supervised learning, or inverse reinforcement learning) is performed so as to emulate the action of a person, and begin learning from an appropriate starting point.

"Reinforcement learning" is a learning method for learning not only determinations or classifications but also actions, to learn an appropriate action based on the interaction of environment to an action, i.e., an action to maximize rewards to be obtained in the future. This indicates, in the present embodiment, that an action, which can exert an effect on the future, can be acquired. The explanation of reinforcement learning will be continued below using, for example, Q-learning, but reinforcement learning is not limited to Q-learning.

Q-learning is a method for learning a value $Q(s, a)$ at which an action a is selected under an environmental state s. In other words, it is only required that the action a having the highest value $Q(s, a)$ is selected as an optimal action a, under a given state s. However, initially, the correct value of the value $Q(s, a)$ for a combination of the state s and the action a is completely unknown. Then, the agent (the subject of an action) selects various actions a under a given state s, and gives rewards to the actions a at that time. Thus, the agent learns selection of a more beneficial action, i.e., the correct value $Q(s, a)$.

As a result of the action, maximization of the sum of rewards to be obtained in the future is desired, and accordingly, $Q(s, a) = E[\Sigma \gamma^t r_t]$ is aimed to be finally achieved (An expected value is set for the time when the state varies in accordance with the optimal action. As a matter of course, the expected value is unknown, and accordingly, should be learned while being searched). The update expression for such a value $Q(s, a)$ is given, for example, by:

$$Q(s_t, a_t) \leftarrow Q(s_t, a_t) + \alpha\left(r_{t+1} + \gamma \max_a Q(s_{t+1}, a) - Q(s_t, a_t)\right) \quad \text{Equation (1)}$$

where $s_t$ is the state of environment at time t, and at is the action at time t. Upon the action at, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by γ. γ is the parameter having a range of $0 < \gamma \leq 1$, and is called discount rate. α is the learning factor, and has a range of $0 < \alpha \leq 1$.

This equation expresses a method for updating an evaluation value $Q(s_t, a_t)$ of an action at in a state $s_t$ based on a reward $r_{t+1}$ which has been returned as a result of a trial at. If an evaluation value $Q(s_{t+1}, \max a_{t+1})$ of the optimal action max a in a subsequent state caused by the reward $r_{t+1}$+ the action a is greater than the evaluation value $Q(s_t, a_t)$ of the action a in the state s, $Q(s_t, a_t)$ is increased. In the contrary case, i.e., the evaluation value $Q(s_{t+1}, \max a_{t+1})$ is smaller than the evaluation value $Q(s_t, a_t)$, $Q(s_t, a_t)$ is decreased. In other words, the value of a given action in a given state is tried to approach the reward immediately returned as a result, and the value of an optimal action in the subsequent state caused by the given action.

Examples of the method for expressing Q(s, a) on a computer include a method for preserving the values of all state action pairs (s, a) as a table (action-value table), and a method for preparing a function to approximate Q(s, a). In the latter method, the above updated expression can be achieved by adjusting a parameter of the approximate function using a method, such as stochastic gradient descent. Examples of the approximate function include a neural network that will be described later.

Figure 4:
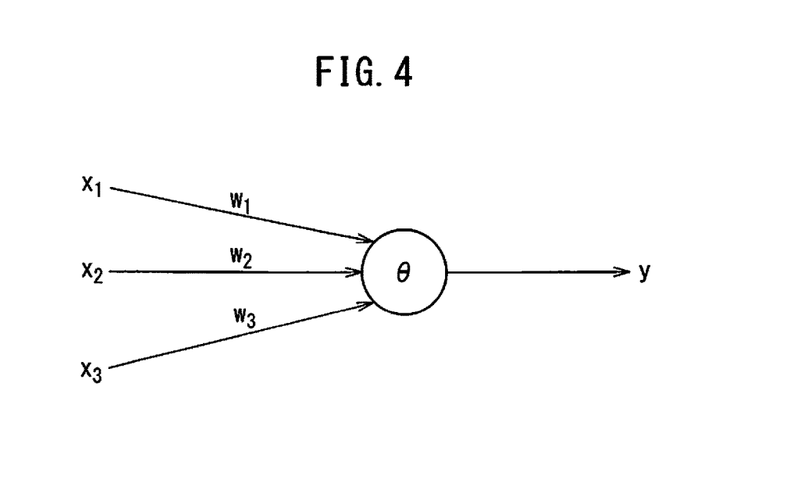
FIG. 4 is a schematic diagram illustrating a neuron model.

As an approximate algorithm of a value function in supervised learning, unsupervised learning, and reinforcement learning, a neural network can be used. The neural network is comprised of, for example, an arithmetic device and a memory, which realize a neural network simulating a neuron model as shown in FIG. 4. FIG. 4 is a schematic diagram illustrating a neuron model.

As shown in FIG. 4, a neuron outputs an output y in response to a plurality of inputs x (inputs x1 to x3 are provided herein as an example). Weights w (w1 to w3) are applied to the corresponding inputs x1 to x3. This causes the neuron to output the output y that is expressed by the equation below. The inputs x, the output y, and the weights w are vectors.

$$y = f_k(\Sigma_{i=1}^n x_i w_i - \theta) \quad \text{Equation (2)}$$

where θ is the bias, and $f_k$ is the activation function.

Figure 5:
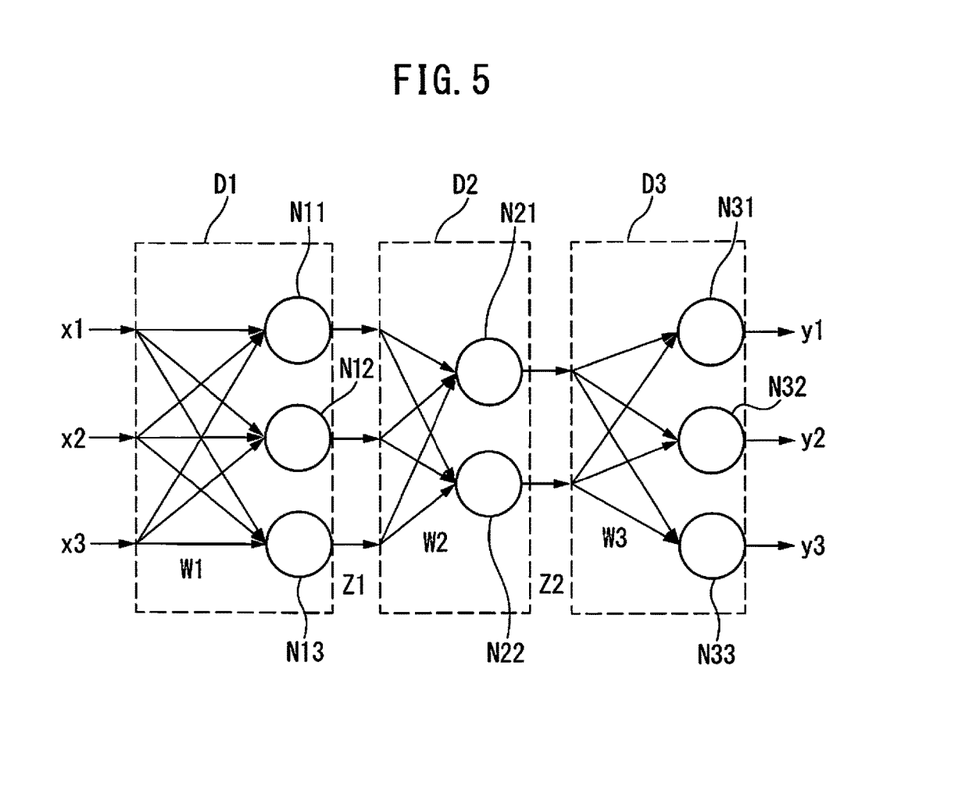
FIG. 5 is a schematic diagram illustrating a three-layer neural network model.

A three-layer weighted neural network comprised of a combination of neurons as described above will now be described below with reference to FIG. 5. FIG. 5 is a schematic diagram illustrating a weighted neural network having three layers D1 to D3.

As shown in FIG. 5, a plurality of inputs x (inputs x1 to x3 are provided herein as an example) are inputted from the left side of the neural network, and results y (results y1 to y3 are provided herein as an example) are outputted from the right side of the neural network.

Specifically, the inputs x1 to x3, to which the corresponding weights have been applied, are respectively inputted to three neurons N11 to N13. These weights applied to the inputs are collectively designated by w1.

The neurons N11 to N13 respectively output z11 to z13. These z11 to z13 are collectively designated by a feature vector z1, and can be treated as a vector obtained by extracting a feature amount of an input vector. This feature vector z1 is a feature vector between the weight w1 and the weight w2.

The feature vectors z11 to z13, to which the corresponding weights have been applied, are inputted to two neurons N21 and N22. These weights applied to the feature vectors are collectively designated by w2.

The neurons N21 and N22 respectively output z21 and z22. These z21 and z22 are collectively designated by a feature vector z2. This feature vector z2 is a feature vector between the weight w2 and the weight w3.

The feature vectors z21 and z22, to which the corresponding weights have been applied, are inputted to three neurons N31 to N33. These weights applied to the feature vectors are collectively designated by w3.

Finally, the neurons N31 to N33 respectively output the results y1 to y3.

The operation of the neural network includes a learning mode and a value prediction mode. A learning dataset is used to learn the weights w in the learning mode, and parameters obtained from the learning are used to determine the action of the processing machine in the prediction mode (For convenience, the term "prediction" is used herein, but various tasks including detection, classification, deduction, etc. can be performed).

It is possible to perform not only learning (online learning), in which data that have been acquired by actual operation the processing machine in the prediction mode are immediately learned, and are reflected in a subsequent action, but also learning (batch learning), in which previously collected data are collectively learned using a group of the data, and thereafter, a detection mode is performed using parameters obtained from the learning. Another learning mode can be interposed every time a predetermined amount of data are collected.

The weights w1 to w3 can be learned by an error back propagation method. The information on errors is introduced from the right side to the left side. The error back propagation method is a method for adjusting (learning) each weight so as to reduce a difference between the output y when the input x is inputted and the true output y (teacher) in each neuron.

In such a neural network, three or more layers can be provided (This is called deep learning). An arithmetic device, which extracts features from input data, in a stepwise fashion, to return a result, can be automatically acquired from only teacher data.

Thus, reinforcement learning, a type of a machine learning method, e.g., Q-learning is employed in the machine learning apparatus 16 provided with, for example, the state observation unit 17 and learning unit 18. As a matter of course, the machine learning method which can be applied to the present invention is not limited to Q-learning. When, for example, supervised learning is applied, the value function corresponds to the learning model, and the reward corresponds to the error.

Figure 6:
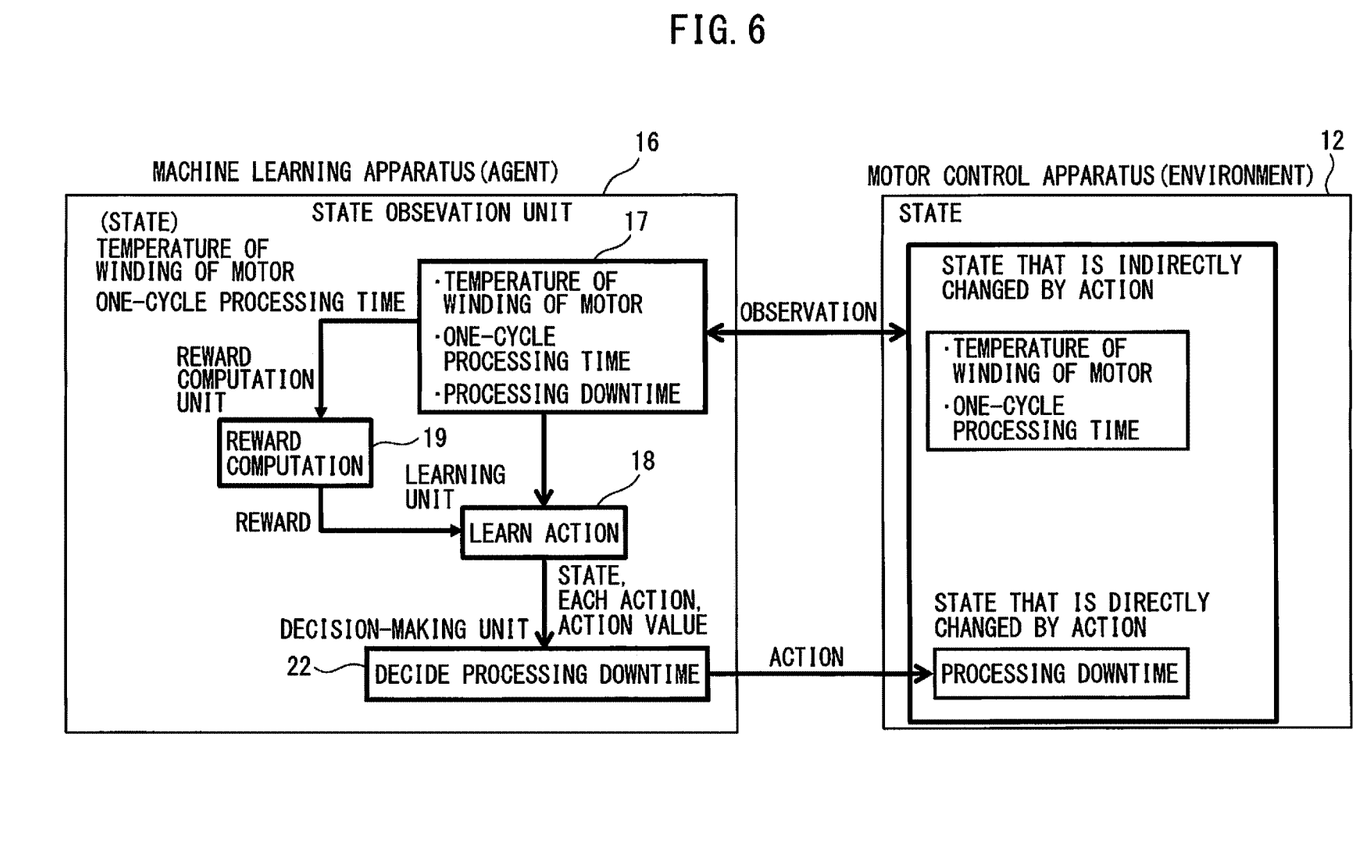
FIG. 6 is an explanatory view of the state and action in a motor control apparatus (environment) and a machine learning apparatus (agent), to which Q-learning is applied.

FIG. 6 is an explanatory view of the state and action in the motor control apparatus 12 (environment) and the machine learning apparatus 16 (agent), to which Q-learning is applied.

As shown in FIG. 6, the action of the machine learning apparatus 16 (agent) is to decide the processing downtime B in the one-cycle processing time T. Further, The state in the motor control apparatus 12 (environment) includes a state which is indirectly changed by the action, and a state which is directly changed by the action. The state which is indirectly changed by the action includes the actual one-cycle processing time T and the temperature of the winding of the motor 11. The state which is directly changed by the action is the processing downtime B which should be set in the motor control apparatus 12.

The state s used in Equation (1) corresponds to a state variable including the processing downtime B decided by the decision-making unit 22 and at least one of the actual one-cycle processing time T of the processing machine 10 and the temperature of the motor 11. Further, the reward $\gamma_{t+1}$ is acquired by the reward computation unit 19. The function update unit 20 updates the value $Q(s_t, a_t)$, i.e., the value function based on the reward $\gamma_{t+1}$. In this respect, it is preferable that the function update unit 20 causes the value $Q(s_t, a_t)$ to be associated with each pair of the state s and the action a when the value function is updated, to make an action-value table.

Further, after the completion of machine learning performed by the learning unit 18, the decision-making unit 22 decides the processing downtime B corresponding to the highest value with reference to the action-value table. However, during machine learning, the decision-making unit 22 randomly decides the processing downtime B and transmits the same to the motor control apparatus 12.

FIG. 1 shows that the machine learning apparatus 16 is provided outside of the motor control apparatus 12. However, the machine learning apparatus 16 may be provided within the motor control apparatus 12. Alternatively, the machine learning apparatus 16 may be provided in a cloud server (not shown).

Figure 7:
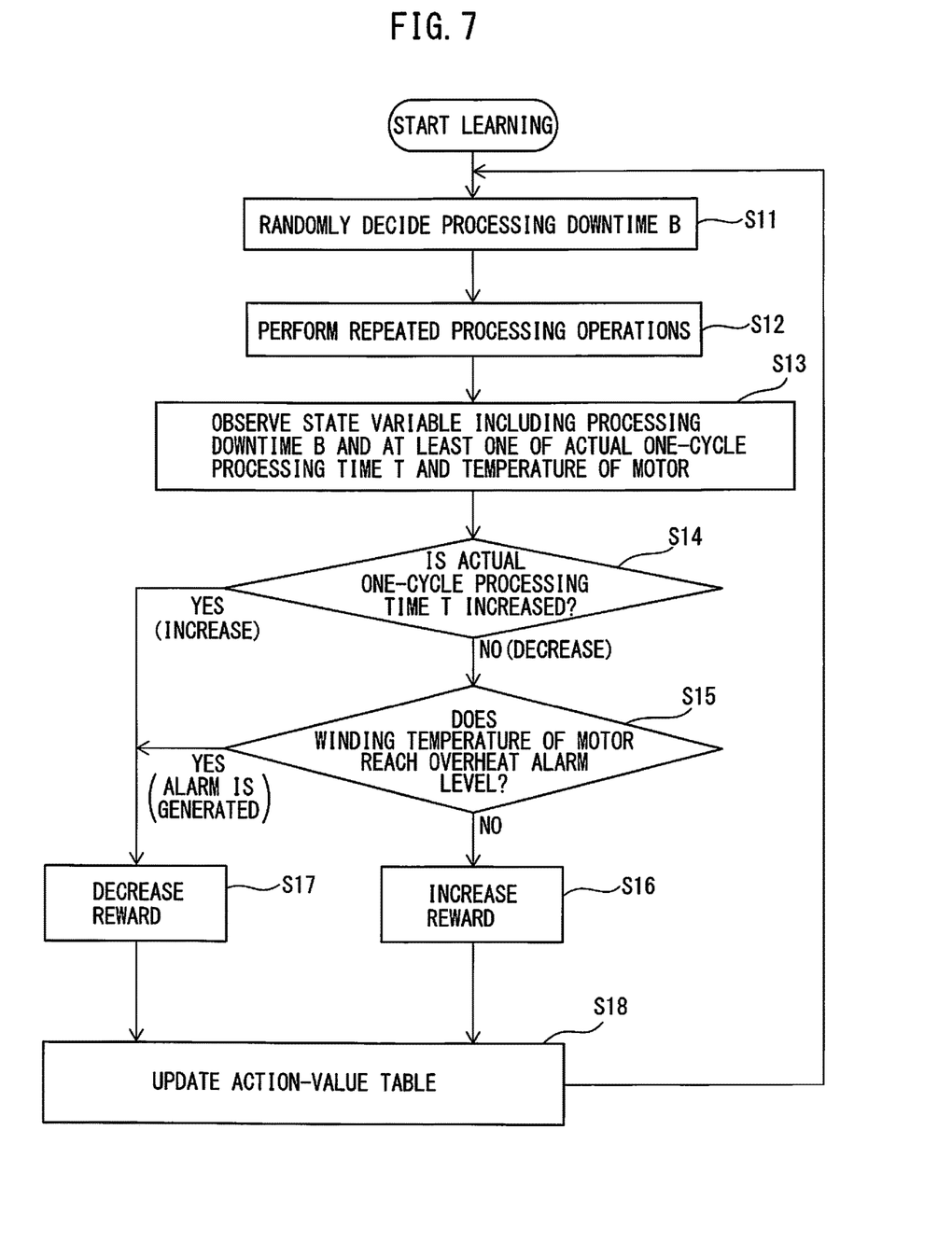
FIG. 7 is a flowchart for explaining an operation procedure of a machine learning apparatus shown in FIG. 1.

An example of the operation of the machine learning apparatus 16 provided in the processing machine 10 according to the present embodiment will now be described below. FIG. 7 is a flowchart for explaining the operation procedure of the machine learning apparatus 16 shown in FIG. 1.

When machine learning starts, first, in step S11, the decision-making unit 22 of the machine learning apparatus 16 randomly decides the processing downtime B, and transmits the same as a command value to the motor control apparatus 12. Then, the processing downtime B as a command value is written in an operation program for performing repeated processing operations within the motor control apparatus 12.

Subsequently, in step S12, the motor control apparatus 12 controls the motor 11 so as to perform the repeated processing operations in accordance with the operation program in which the processing downtime B is set. Note that, in the present embodiment, a predetermined number of repeated processing operations are performed.

Subsequently, in step S13, the state observation unit 17 of the machine learning apparatus 16 observes, while the repeated processing operations are performed, the state variable at least composed of the processing downtime B decided by the decision-making unit 22, the actual one-cycle processing time T of the processing machine 10, and the temperature of the motor 11.

After that, in step S14, the learning unit 18 determines whether the one-cycle processing time T observed by the state observation unit 17 increases with respect to the actual one-cycle processing time T corresponding to an action having the lowest Q-value in the action-value table in the function update unit 20.

The action-value table in the function update unit 20 is made in step S18 that will be described later. However, it is preferable that, before machine learning begins, a minimum Q-value is stored as an initial value in the action-value table. The Q-value here designates the value function obtained by Equation (1), i.e., the value $Q(s_t, a_t)$.

In step S14 above, when the one-cycle processing time T observed by the state observation unit 17 decreases in comparison with the actual one-cycle processing time T corresponding to an action having the lowest Q-value in the action-value table in the function update unit 20, the process shifts to step S15.

In step S15, the learning unit 18 determines whether the temperature of the winding of the motor 11 reaches the overheat alarm level P during the repeated processing operations.

When the temperature of the winding of the motor 11 does not reach the overheat alarm level P in step S15, the process shifts to step S16.

In step S16, the reward computation unit 19 of the learning unit 18 increases the reward to be given to the value of the action which has decided the processing downtime B in step S11. In short, the value of the reward $\gamma_{t+1}$ in Equation (1) is increased. Subsequently, in step S18, the function update unit 20 updates the value function (value $Q(s_t, a_t)$) as well as the action-value table, based on the reward $\gamma_{t+1}$.

In the reward computation in step S16, it is preferable to decrease the increased value of the reward in accordance with the difference between the temperature α of the winding of the motor 11 (see FIG. 2) measured at the end of the last processing operation time A when a predetermined number of repeated processing operations are performed, and the overheat alarm level P. In other words, as the difference between the temperature a of the winding and the overheat alarm level P increases, the reward computation unit 19 decreases the increased value of the reward.

In contrast, in step S14, when the one-cycle processing time T observed by the state observation unit 17 increases in comparison with the actual one-cycle processing time T corresponding to an action having the lowest Q-value in the action-value table in the function update unit 20, the process shifts to step S17. Further, when the temperature of the winding of the motor 11 reaches the overheat alarm level P in step S15, the process shifts to step S17.

In step S17, the reward computation unit 19 of the learning unit 18 reduces the reward to be given to the value of the action which has decided the processing downtime B in step S11. In short, the value of the reward $\gamma_{t+1}$ in Equation (1) is reduced. Then, in step S18, the function update unit 20 updates the value function (value $Q(s_t, a_t)$) as well as the action-value table, based on the reward $\gamma_{t+1}$.

Repeating step S11 to step S18 causes the learning unit 18 to continue to update the action-value table.

It is preferable that, after the end of machine learning, the decision-making unit 22 decides the processing downtime B corresponding to the highest value with reference to the action-value table, and transmits the same to the motor control apparatus 12.

The processing machine 10 provided with the machine learning apparatus 16 machines a workpiece secured to an operation table of the processing machine 10, using a tool, such as a drill, actually rotated by the motor 11 during machine learning. In this respect, it is preferable to drive the motor 11 while coolant such as cutting fluid is supplied to the tool and the workpiece. In other words, in order to accurately find the processing downtime B, it is preferable to perform machine learning after a coincidence of the machining state in the processing machine 10 with the actual state is complete as in the present embodiment.

As described above, the motor control apparatus 12 provided with the machine learning apparatus 16 and the processing machine 10 in the present embodiment can find, without an operator, the shortest processing downtime B, which satisfies the fact that the temperature of the winding of the motor 11 does not exceed the overheat alarm level P when the processing machine 10 performs repeated processing operations. This reduces the labor or time required of an operator, which is necessary to set the processing downtime B in the motor control apparatus 12.

Note that the machine learning applied to the present invention is not limited to Q-learning described above. For example, the machine learning apparatus 16 may set an optimal action by making multiple layers by deep learning, using a neural network. In place of the action-value table including the value functions (value $Q(s_t, a_t)$), a neural network, which outputs the action-value variable for each action a when a predetermined state s is given, can be used.

In the above embodiments, as shown in FIG. 1, one machine learning apparatus 16 is provided for one motor control apparatus 12. However, in the present invention, the number of the motor control apparatus 12 and the machine learning apparatus 16 is not limited to one. For example, the processing machine 10 may be provided with a plurality of motors 11 and motor control apparatuses 12, and one or more machine learning apparatuses 16 may be provided for the corresponding motor control apparatuses 12. Further, it is preferable that each machine learning apparatus 16 can transmit the learned information to the other machine learning apparatuses via communication cables or a network. Thus, the action-value table updated by the learning unit 18 of one machine learning apparatus 16 can be used to update the action-value table in the learning unit 18 of another machine learning apparatus 16.

The present invention has been described above using exemplary embodiments. However, a person skilled in the art would understand that the aforementioned modifications and various other modifications, omissions, and additions can be made without departing from the scope of the present invention.

The invention claimed is:

1. A machine learning apparatus that is adapted to determine a processing downtime of a one-cycle processing time comprised of a one-cycle processing operation time and the processing downtime of one processing machine, so that the temperature of a motor for performing repeated processing operations of the processing machine does not exceed a predetermined temperature threshold, comprising a processor configured to:

observe, during the repeated processing operations, a state variable including the processing downtime, an actual one-cycle processing time of the processing machine, and an actual temperature of the motor with respect to one processing machine;

learn a value for selecting, based on the state variable and the temperature threshold, the shortest processing downtime, which satisfies the fact that the temperature of the motor does not exceed the temperature threshold when the repeated processing operations are performed;

compute a reward based on the one-cycle processing time and the temperature of the motor of the state variable;

update a value function representing a value for selecting the shortest processing downtime based on the reward; and decide the processing downtime which is set in a motor control apparatus, wherein the motor control apparatus controls, based on the processing downtime decided by the processor, the motor for performing repeated processing operation of the processing machine.

2. The machine learning apparatus according to claim 1, further comprising:

a storage storing an action-value table in which the state variable is associated with the value function, wherein the processor is configured to update the action-value table based on the reward.

3. The machine learning apparatus according to claim 2, wherein the processor is configured to increase the reward based on the difference between the temperature of the motor when the repeated processing operations are performed and the temperature threshold, when the one-cycle processing time observed by the processor decreases in comparison with the one-cycle processing time corresponding to the lowest value function in the action-value table, and the processor is configured to decrease the reward when the one-cycle processing time observed by the processor increases in comparison with the one-cycle processing time corresponding to the lowest value function in the action-value table, and when the temperature of the motor reaches the temperature threshold when the repeated processing operations are performed.

4. A motor control apparatus comprising the machine learning apparatus according to claim 1.

5. A processing machine comprising the motor control apparatus according to claim 4.

6. A machine learning method for determining a processing downtime of a one-cycle processing time comprised of a one-cycle processing operation time and the processing downtime of one processing machine, so that the temperature of a motor for performing repeated processing operations of the processing machine does not exceed a predetermined temperature threshold, comprising:

observing, during the repeated processing operations, a state variable including the processing downtime, an actual one-cycle processing time of the processing machine, and an actual temperature of the motor with respect to one processing machine;

learning a value for selecting, based on the state variable and the temperature threshold, the shortest processing downtime, which satisfies the fact that the temperature of the motor does not exceed the temperature threshold when the repeated processing operations are performed;

computing a reward based on the one-cycle processing time and the temperature of the motor of the state variable during the learning;

updating a value function representing a value for selecting the shortest processing downtime based on the reward; and deciding the processing downtime when the motor is controlled using a motor control apparatus for controlling, based on the decided processing down time, the motor for performing repeated processing operation of the processing machine.

\* \* \* \* \*